Nov. 21, 1967　　　　　T. P. FOLEY　　　　　3,353,483
LAMINATED TIMING WHEEL FOR HIGH SPEED PRINTERS
Filed April 6, 1967　　　　　　　　　　　　　2 Sheets-Sheet 1

INVENTOR
THOMAS P. FOLEY

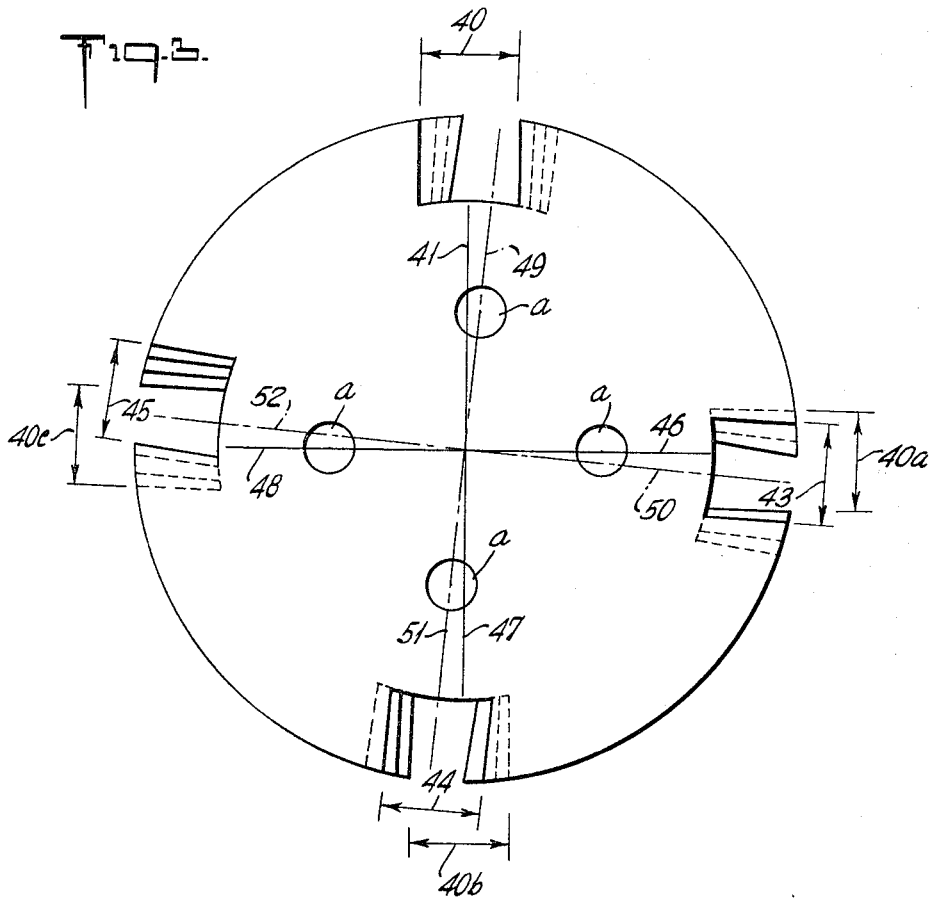
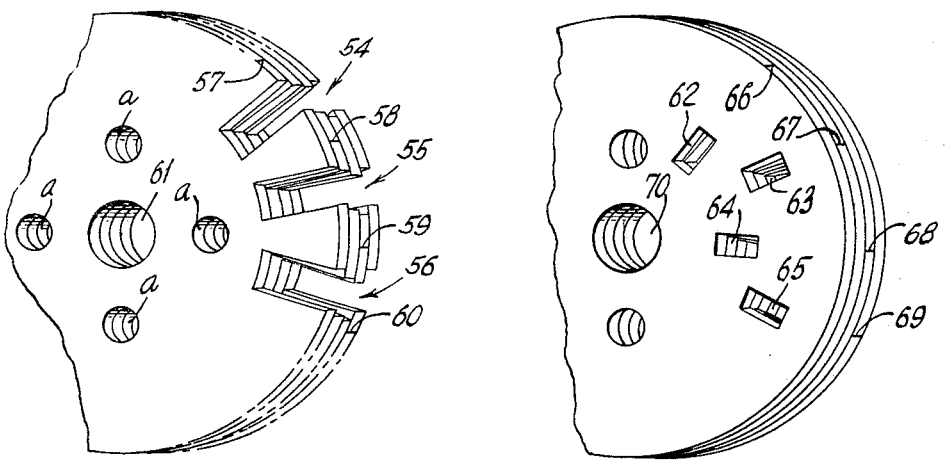

3,353,483
LAMINATED TIMING WHEEL FOR
HIGH SPEED PRINTERS
Thomas P. Foley, Huntington, N.Y., assignor to Potter Instrument Company, Inc., Plainview, N.Y., a corporation of New York
Filed Apr. 6, 1967, Ser. No. 628,985
7 Claims. (Cl. 101—93)

ABSTRACT OF THE DISCLOSURE

A timing disc comprises a stack of similarly formed laminae in which each lamina is rotated a certain distance with respect to the other laminae in order to minimize the effects of any error in the slot position.

Background of the invention

The present invention, generally, relates to a timing disc, and more particularly, to a new and improved timing disc structure for high speed impact printers.

In certain high speed printers used in the data processing industry today, the location of each type character at any instant as it moves along the printing line is determined by a timing mechanism which advantageously may employ such well known devices as electromagnetic transducers or photoelectric cells. These devices respond to some form of discontinuity which interrupts a preestablished condition of the device, and thereby, an electrical pulse is generated.

Such discontinuities usually are obtained by apertures or slots in a wheel at predetermined angular spacings, and the timing wheel is rotated in synchronism with movement of the drum or chain. Therefore, the accuracy of the timing pulses is related directly to the accuracy with which the apertures or slots can be physically formed in their respective angular positions on the wheel.

The mechanical accuracy with which slots may be formed in a timing wheel, as determined by measuring the slot-to-slot pitch (the angular distance between adjacent slots), is limited to about plus or minus .002 inch by practical machining considerations. From a measurement of the pulses generated by prior timing wheels, the "jitter," which is the variations in time of pulses from a fixed time reference, can be observed to be in the order of plus or minus 45 microseconds in a particular configuration.

When it is considered that each character in a chain-type printer travels along the printing line at approximately 0.200 inch in 1,216 microseconds, a variation in occurrence of the timing pulses in an amount of plus or minus 45 microseconds can produce as much as plus or minus .007 inch horizontal misregistration between adjacent characters, for example.

Accordingly, it is an object of the present invention to provide a new and improved timing wheel structure.

It is also an object of the invention to provide a timing wheel with its discontinuities located with improved accuracy.

A further object of the invention is to provide a timing wheel structure that is economical to produce yet capable of generating accurate timing pulses.

Yet another object of the invention is to provide a new and improved timing wheel structure for a high speed printer to obtain better registration of printed characters.

Summary of the invention

Briefly, a timing wheel constructed in accordance with the principles of the present invention is a laminate or stack of separate discs, each disc having regions of discontinuity formed in a predetermined pattern. The pitch dimension between adjacent regions of discontinuity is predetermined to achieve a desired timing for information pulses generated in response thereto. Each disc is rotated slightly with respect to the other discs so that any errors in the pitch dimension are reduced to a minimum.

Brief description of the drawings

These and other objects and advantages of the present invention will become more readily apparent from the following detailed description of a presently preferred form thereof taken in conjunction with the accompanying drawings, in which:

FIGURE 3 is a plan view of a four-slot timing wheel for the purpose of illustrating the principles of the invention;

FIGURE 4 is a fragmentary view in perspective of one form of timing wheel constructed in accordance with the principles of the invention; and FIGURE 5 is a fragmentary view in perspective of another form of timing wheel constructed in accordance with the principles of the invention.

Description of the preferred embodiments

Figure 1:
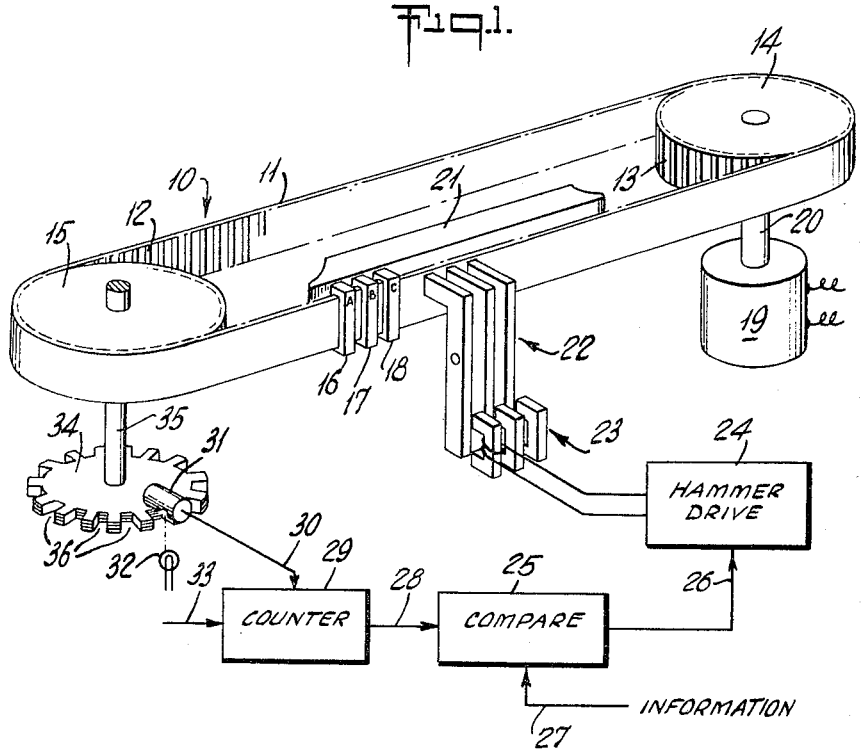
FIGURE 1 is a diagrammatic illustration of a chain-type printer with a timing wheel in accordance with the present invention.

Referring now to the drawings, while the invention may have advantageous uses in other fields and with other apparatus, it is particularly useful with high speed printers in the data processing field. FIGURE 1 shows a chain-type high speed printer, identified generally by the reference numeral 10, and is disclosed more fully in co-pending patent application Ser. No. 509,501 and filed Nov. 24, 1965 and assigned to the same assignee as the present invention. While it will be understood that the invention may be used with a drum-type printer, the following description will refer to the chain-type printer 10.

Reviewing the printer 10 briefly, a belt 11 has teeth 12 to fit with teeth 13, in a non-slipping manner, on both of two gears 14 and 15. A plurality of type-carrying slugs, such as illustrated by the slugs 16, 17 and 18, are supported by the belt 11, and a more detailed description is presented in the above referred to patent application. An electric motor 19 is connected directly to the gear 14 by a shaft 20, so that turning the gear 14 also turns the gear 15 by means of the toothed belt 11.

The printing type slugs slide along a back-up bar 21, which provides support for the slugs during impact by one of a plurality of printing hammers, indicated generally by the reference numeral 22. Ordinarily during operation of the printer 10, a printing medium such as an elongated strip of paper, usually with interleaved carbon and copy sheets, is conveyed in stepped fashion in between the hammers 22 and the type slugs 16, 17 and 18. However, such printing medium has been omitted in the drawing so that the structure of the printer is more readily visible.

The line traversed by the printing type A, B, C, etc., between the hammers 22 and the back-up bar 21 is referred to as the "printing line."

Each of the printing hammers 22 is actuated individually by separate electromagnets 23 from a hammer drive circuit 24. The hammer drive circuit 24, in turn, is responsive to signals from a "compare" circuit 25 over a connection 26 in a manner which now is well known in the art. For example, U.S. Patent No. 3,220,343 granted Nov. 30, 1965, includes a description of a compare circuit for sensing the identity of the print type that will be in position next for printing and comparing this information with the print type that is desired to be printed next. When there is a match, a signal over the connection 26 will activate the hammer drive circuit 24 for energizing the appropriate one of the electromagnets 23.

Information as to the desired character to be printed at each position along the printing line is fed into the "compare" circuit 25 over a connection 27 from an external source, not shown, such as a computer central processing unit. Information as to the particular character that will be available for printing is fed into the "compare" circuit 25 over a connection 28 from a counter circuit 29.

The counter circuit 29 is stepped along in its count each time a pulse is received over a connection 30. Such a pulse is generated by a suitable radiation sensing device 31, such as a photoelectric cell for example, each time the beam from a source of radiation 32 is interrupted. Obviously, the radiation sensing device may be so biased that the desired clock pulse is generated each time radiation from the source 32 reaches the sensing device 31, rather than being interrupted. An example of a suitable source of radiation would be an electric light bulb.

A separated timing disc is used to provide a reset pulse over line 33 to the counter circuit 29 each time the sequence of type characters available for printing is repeated. For example, if the printing type characters supported on the belt 11 are from A to Z, after the Z is past and before the A arrives again, the counter circuit 29 is reset by a pulse over the connection 33.

To interrupt the radiation from the source 32 to the sensing device 31 at regular and accurate intervals, a timing wheel 34 is supported rotatably on a shaft 35 so that the timing wheel 34 turns in synchronism with the movement of the belt 11. However, as mentioned previously, the accuracy with which the plurality of slots 36 can physically be formed in the timing wheel 34 is limited, and it has been demonstrated that at the high speeds at which the belt 11 travels, these slots 36 must be formed with still greater accuracy if the quality of the printed matter is to be improved.

Figure 2:
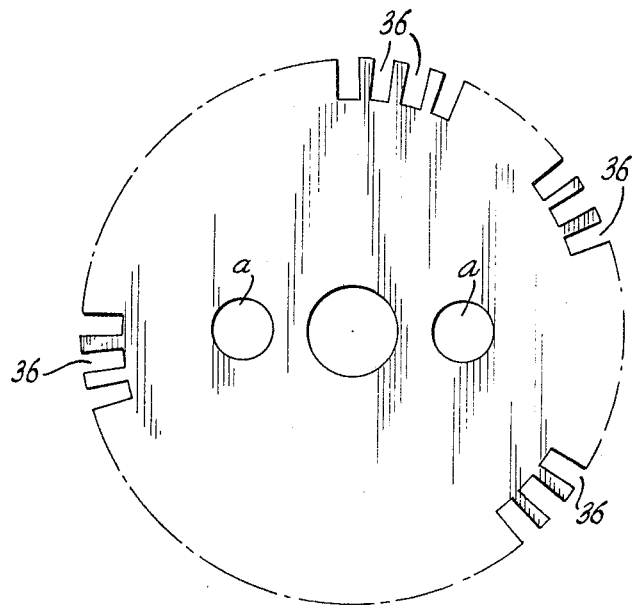
FIGURE 2 is a plan view of the timing wheel shown in FIGURE 1.

FIGURE 2 illustrates a timing wheel having a plurality of slots formed at regular angular positions around the rim of the wheel. As each one of these slots moves past the radiation sensing device 31, a pluse is generated, in response to which the counter circuit 29 is stepped another position. This timing wheel illustrated in FIGURE 2 is an elarged plan view of the timing wheel 34 shown in FIGURE 1. Constructed in accordance with the principles of the present invention, this timing wheel 34, instead of being formed from a single disc as heretofore known in the art, is formed of a stack of thin discs with each successive disc rotated in the stack.

Referring to FIGURE 3 to illustrate the principles of the invention with greater particularity, there is shown a laminated timing wheel composed of four separate, identically manufactured discs each having four slots spaced around the periphery of the disc and four bores *a* located on the center lines of the slots, for example. It is desired that center lines of the four composite slots in the finally assembled disc be aligned along four mutually perpendicular coordinates such as 49, 50, 51 and 52. It will be understood that each disc will be formed with as many slots as are desired in the final composite disc and that any convenient number of aligning holes *a* may be used.

In constructing the timing disc, the first lamina is placed on a suitable jig (not shown) with posts on the jig engaging the bores *a*. The next lamina is then placed on the jig with its slots rotated 90 degrees relative to the corresponding slots on the first lamina so that its first slot 40*a* corresponding to slot 40 is displaced 90 degrees from slot 40. The third lamina is then placed on the jig with its slots rotated 90 degrees from the corresponding slots on the second lamina so that its first slot 40*b* is displaced from slots 40 and 40*a*, and the fourth is finally placed on top with its slots rotated 90 degrees from the corresponding slots in the third lamina so that its first slot 40*c* is positioned as shown.

In operation, looking clockwise from the center line 41 of the first lamina, the remaining slots 43, 44 and 45 in this upper disc may have successively greater angular positions than a desired 90 degrees pitch due to errors in manufacture. For example, due to an error the center line 46 of slot 43 may be 92½ degrees from the center line 41 of slot 40, the center line 47 of slot 44 may be displaced from 92½ degrees from the center line 46 of slot 43, and similarly, the center line 48 of slot 45 may be 92½ degrees from the center line of slot 44. However, the center lines 49, 50, 51 and 52 of the composite disc are substantially perpendicular to one another.

With the discs positioned as described above, they are laminated together by any suitable bond, such as by an epoxy cement, to form a single, unitary timing wheel.

Any suitable reference mark may be used to assist the fabricator in orienting the successive discs so that corresponding slots are in order to form the final timing wheel, such as an appropriate edge marking may be used.

An example of such edge marking is shown in FIGURES 4 and 5. FIGURE 4 shows a timing wheel formed with slots (openings that open into the rim of each disc), and some of these slots are indicated generally by the reference numerals 54, 55 and 56. Four discs are shown for the purpose of illustrating the edge markings 57, 58, 59 and 60. It will be obvious, of course, that any number of discs may be used, and any desired configuration may be adopted for the shaft opening 61, depending on such things as the shape of the shaft to support the timing wheel.

FIGURE 5 shows a timing wheel similar to that shown in FIGURE 4 and described above, except that a plurality of apertures 62, 63, 64 and 65 are formed by the separate discs. The discs are assembled and positioned as described above in connection with FIGURE 3, and edge markings 66, 67, 68 and 69 are similar to that described in connection with FIGURE 4.

It should be understood that it is not necessary that the number of separate discs equal the number of slots or that just four separate discs must be used. With a timing wheel such as shown in FIGURE 2, it may be desired to rotate successive discs by an angular amount equal to several slots, for example.

The thickness of each separate disc may be any suitable thickness, as thick as a sheet of paper or as thick as an inch. This dimension should be determined by convenience and suitability for a desired thickness of the final timing wheel.

It will be apparent from the foregoing that the principles of the present invention may be embodied in a wide range of specific structures for an equally wide range of specific uses. Various modifications in shapes and configurations for timing wheels for the arrangement of the separate discs will occur to those skilled in the art to function in particular environments. Accordingly, it is intended that the scope of the present invention be limited only as set forth in the appended claims.

What is claimed is:

1. In a high speed printer having a timing wheel and having a support means for moving a plurality of print type past a printing line and having means for rotating the timing wheel in synchronism with the support means to generate information pulses, the timing wheel comprising:

a plurality of separate discs having regions of discontinuity formed in a predetermined pattern, the pitch dimension between adjacent regions of discontinuity representing a predetermined timing for the information pulses, and said plurality of discs being supported contiguously to form said timing wheel, each successive disc being rotated a predetermined degree, so that any errors in said pitch dimension are reduced to a minimum.

2. In a high speed printer as set forth in claim 1 wherein said regions of discontinuity are formed by slots.

3. In a high speed printer as set forth in claim 1 wherein said regions of discontinuity are formed by apertures.

4. In a high speed printer as set forth in claim 1 wherein said regions of discontinuity are formed by areas of magnetic material.

5. In a high speed printer as set forth in claim 1 wherein each of said separate discs is formed to be substantially identical with the other discs in said plurality.

6. In a high speed printer as set forth in claim 5 wherein each of said separate discs has a position identifying means so that the degree of angular rotation of one disc relative to another disc is determined.

7. In a high speed printer as set forth in claim 1 wherein said plurality of discs are bonded together to form a unitary laminated timing wheel.

References Cited
UNITED STATES PATENTS

| | | | |
|---|---|---|---|
| 2,906,200 | 9/1959 | Pfleger | 101—93 |
| 2,975,403 | 3/1961 | Doersam | 340—149 |
| 3,001,469 | 9/1961 | Davis et al. | 101—93 |
| 3,015,265 | 1/1962 | Gmeiner | 101—93 |
| 3,049,990 | 8/1962 | Brown et al. | 101—93 |
| 3,072,047 | 1/1963 | Maudsley et al. | 101—93 |
| 3,117,514 | 1/1964 | Doersam | 101—93 |
| 3,135,195 | 6/1964 | Potter | 101—93 |
| 3,167,002 | 1/1965 | Kaneda et al. | 101—93 |
| 3,332,068 | 7/1967 | McLaughlin et al. | 101—93 |

WILLIAM B. PENN, *Primary Examiner.*